(12) United States Patent
Wang et al.

(10) Patent No.: US 11,729,508 B2
(45) Date of Patent: Aug. 15, 2023

(54) CONTROL CIRCUIT, PTZ CAMERA, CONTROL METHOD, AND COMPUTER-READABLE STORAGE MEDIUM

(71) Applicant: Shenzhen Reolink Technology Co., Ltd., Shenzhen (CN)

(72) Inventors: Aijun Wang, Shenzhen (CN); Guixing Wang, Shenzhen (CN); Wenfu Jiang, Shenzhen (CN)

(73) Assignee: Shenzhen Reolink Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/852,379

(22) Filed: Jun. 29, 2022

(65) Prior Publication Data
US 2023/0199317 A1    Jun. 22, 2023

(30) Foreign Application Priority Data

Dec. 16, 2021   (CN) .......................... 202111544312.5

(51) Int. Cl.
*H04N 23/695* (2023.01)
*H04N 23/60* (2023.01)

(52) U.S. Cl.
CPC ........... *H04N 23/695* (2023.01); *H04N 23/64* (2023.01)

(58) Field of Classification Search
CPC ............................. H04N 23/695; H04N 23/64
USPC ...................................................... 348/211.4
See application file for complete search history.

(56) References Cited

U.S. PATENT DOCUMENTS

| | | | | |
|---|---|---|---|---|
| 6,628,338 | B1* | 9/2003 | Elberbaum | G08B 13/19636 348/373 |
| 8,137,007 | B1* | 3/2012 | Harvey | B64D 47/08 396/12 |
| 8,482,611 | B2* | 7/2013 | Webb | H04N 7/183 348/151 |
| 10,895,801 | B2* | 1/2021 | Bin | H02K 5/225 |
| 2011/0234792 | A1* | 9/2011 | Webb | H04N 7/183 348/143 |
| 2017/0194882 | A1* | 7/2017 | Ren | H02P 5/68 |
| 2018/0004183 | A1* | 1/2018 | Smith | H04B 1/3877 |
| 2020/0073212 | A1* | 3/2020 | Bin | G03B 15/006 |
| 2021/0008416 | A1* | 1/2021 | DeCarlo | A63B 24/0021 |
| 2022/0046228 | A1* | 2/2022 | Haskin | H04N 5/04 |

\* cited by examiner

*Primary Examiner* — Pritham D Prabhakher
(74) *Attorney, Agent, or Firm* — Idea Intellectual Limited; Margaret A. Burke; Sam T. Yip

(57) ABSTRACT

This application discloses a control circuit of a PTZ camera and control method. The control circuit includes: a motor drive circuit, a monitoring circuit, a gimbal motor, and a microprocessor. The motor drive circuit, the gimbal motor, and the microprocessor are electrically connected to the monitoring circuit respectively. The gimbal motor is configured to drive a rotor of the camera to rotate. The monitoring circuit is configured to acquire a first signal between the motor drive circuit and the gimbal motor, and output a second signal to the microprocessor according to the first signal. The microprocessor is configured to obtain an in-place status of the gimbal motor according to the second signal. The motor drive circuit is configured to control an operating state of the gimbal motor according to the in-place status. As a result, the deviation caused by back-and-forth rotation of the gimbal motor can be eliminated in time.

18 Claims, 7 Drawing Sheets

CONTROL CIRCUIT, PTZ CAMERA, CONTROL METHOD, AND COMPUTER-READABLE STORAGE MEDIUM

FIELD OF THE INVENTION

This application relates to the field of security protection, and more specifically, to a control circuit of a pan-tilt-zoom (PTZ) camera, a PTZ camera, a control method for a PTZ camera, and a non-transitory computer-readable storage medium.

BACKGROUND OF THE INVENTION

Some cameras are equipped with a gimbal system. A gimbal motor drives a rotor portion of the camera to rotate, to expand the monitoring range. The power output and control of a gimbal are both controlled by a stepper motor. After the stepper motor is selected, a rotation angle of a monitoring device corresponding to one stepping length by which each time the stepper motor rotates can be determined. Usually, a limiting structure can be arranged on a camera to prevent the monitoring device from rotating more than 360 degrees, so as to prevent the cable from being pulled apart. Because problems of friction and idling between the rotor and the stator are inevitable, the rotation error of the camera gimbal continuously increases as the service time increases, resulting in a problem that when the gimbal rotates to the limiting structure, a gimbal motor cannot perceive this and continuously try to rotate.

SUMMARY OF THE INVENTION

Implementations of this application provide a control circuit of a PTZ camera, a PTZ camera, a control method for a PTZ camera, and a non-transitory computer-readable storage medium, to resolve the foregoing problems, thereby implementing more precise control of a gimbal system of the PTZ camera.

The control circuit of the PTZ camera according to an implementation of this application includes: a motor drive circuit, a monitoring circuit, a gimbal motor, and a microprocessor. The motor drive circuit, the gimbal motor, and the microprocessor are electrically connected to the monitoring circuit respectively. The gimbal motor is configured to drive a rotor of the camera to rotate. The monitoring circuit is configured to acquire a first signal between the motor drive circuit and the gimbal motor, and output a second signal to the microprocessor according to the first signal. The microprocessor is configured to obtain an in-place status of the gimbal motor according to the second signal. The motor drive circuit is configured to control an operating state of the gimbal motor according to the in-place status.

The PTZ camera according to an implementation of this application includes: a body, a camera, a rotor, and a control circuit. The camera is fixedly connected to the rotor, the control circuit is arranged on the body, and the gimbal motor is connected to the rotor. The control circuit includes: a motor drive circuit, a monitoring circuit, a gimbal motor, and a microprocessor. The motor drive circuit, the gimbal motor, and the microprocessor are electrically connected to the monitoring circuit respectively. The gimbal motor is configured to drive a rotor of the camera to rotate. The monitoring circuit is configured to acquire a first signal between the motor drive circuit and the gimbal motor, and output a second signal to the microprocessor according to the first signal. The microprocessor is configured to obtain an in-place status of the gimbal motor according to the second signal. The motor drive circuit is configured to control an operating state of the gimbal motor according to the in-place status.

The control method according to an implementation of this application includes: acquiring a first signal between a motor drive circuit and a gimbal motor, and outputting a second signal according to the first signal; obtaining an in-place status of the gimbal motor according to the second signal; and controlling an operating state of the gimbal motor according to the in-place status.

The non-transitory computer-readable storage medium according to an implementation of this application includes a computer program. The computer program, when executed by one or more processors, causes the one or more processors to implement the following control method: acquiring a first signal between a motor drive circuit and a gimbal motor, and outputting a second signal according to the first signal; obtaining an in-place status of the gimbal motor according to the second signal; and controlling an operating state of the gimbal motor according to the in-place status.

Through the control circuit, the control method, the camera, and the non-transitory computer-readable storage medium according to the implementations of this application, a first signal between a gimbal motor and a motor drive circuit can be monitored, to correspondingly generate a second signal according to the first signal, and then obtain an in-place status of the gimbal motor according to the second signal, to control an operating state of the gimbal motor according to the in-place status. In this way, the deviation caused by back-and-forth rotation of the gimbal motor can be eliminated in time to ensure that the gimbal motor can actually reach an in-place position when the motor drive circuit controls the gimbal motor to rotate to the in-place position.

Additional aspects and advantages of the implementations of this application will be given in the following descriptions, some of which will become apparent from the following descriptions or may be learned through practices of the implementations of this application.

BRIEF DESCRIPTION OF THE DRAWINGS

The foregoing and/or additional aspects and advantages of this application will become apparent and comprehensible from the descriptions of the implementations below with reference to the accompanying drawings.

DETAILED DESCRIPTION:

The following describes implementations of this application in detail. Examples of the implementations are shown in the accompanying drawings, and same or similar reference signs in all the accompanying drawings indicate same or similar components or components having same or similar functions. The implementations that are described with reference to the accompanying drawings are exemplary, and are only used to explain the implementations of this application and cannot be construed as a limitation to the implementations of this application.

Figure 1:
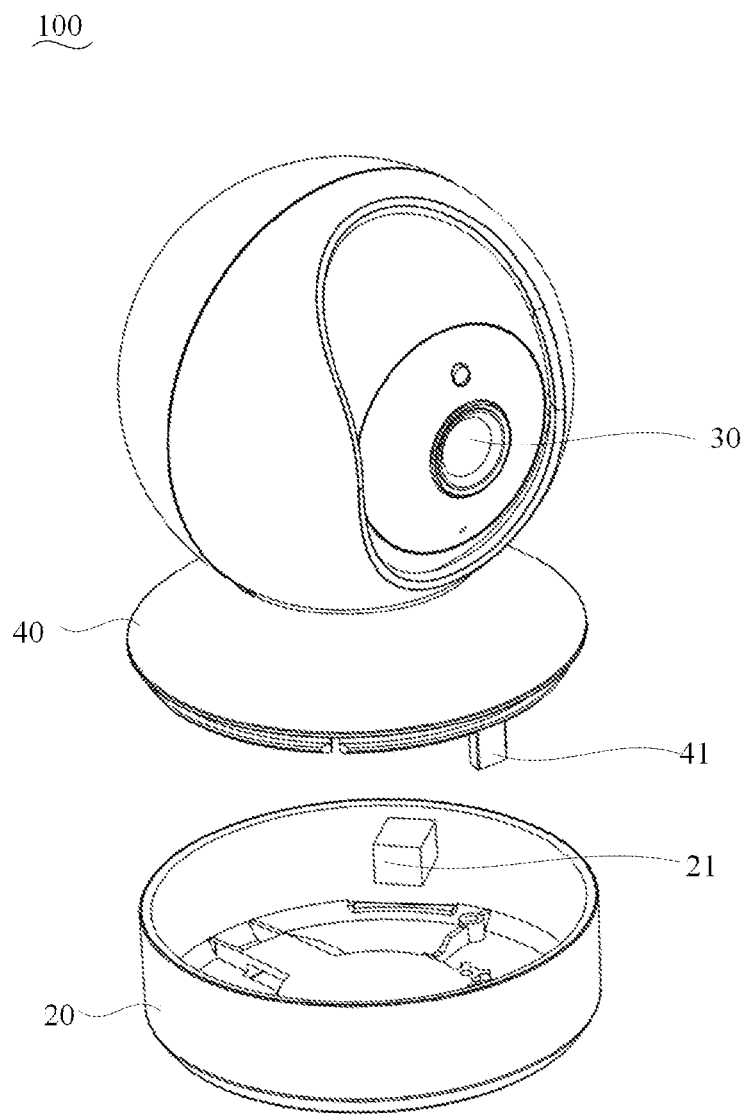
FIG. 1 is a schematic three-dimensional diagram of a PTZ camera according to some implementations of this application.
Figure 2:
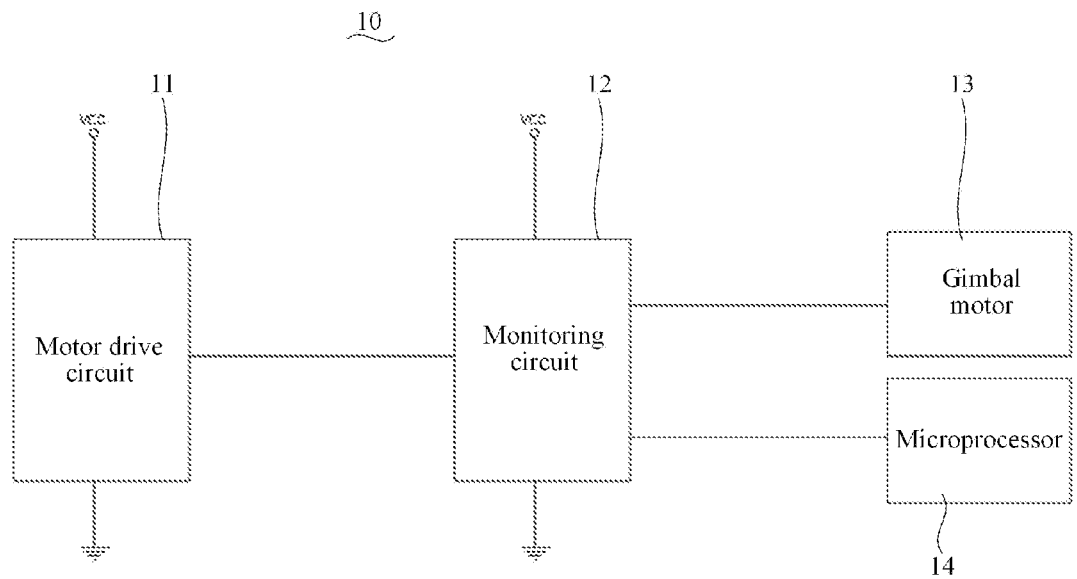
FIG. 2 is a schematic structural diagram of a control circuit of a PTZ camera according to some implementations of this application.

Referring to FIG. 1, an implementation of this application provides a PTZ camera 100. The PTZ camera 100 includes a body 20, a camera 30, a rotor 40, and a control circuit 10 of the PTZ camera 100 (as shown in FIG. 2). The camera 30 is fixedly connected to the rotor 40, and the rotor 40 can drive the camera 30 to rotate relative to the body 20, so that the camera 30 can shoot in various directions. The control circuit 10 is arranged on the body 20.

In some implementations, the PTZ camera 100 may be a dome PTZ camera 100 of a security system. The body 20 and the rotor 40 form a gimbal part of the dome PTZ camera 100. The camera 30 is a monitoring camera 30, and the camera 30 is mounted on the rotor 40, that is, the monitoring camera 30 is mounted on a gimbal of the dome PTZ camera 100. In some implementations, the PTZ camera 100 may alternatively be another type of PTZ camera 100, for example, an in-vehicle PTZ camera 100 (a driving recorder), a household PTZ camera 100, or an industrial PTZ camera 100. The structure of the PTZ camera 100 is not limited to the structure shown in FIG. 1, and is not limited herein.

With reference to FIG. 2, the control circuit 10 includes a motor drive circuit 11, a monitoring circuit 12, a gimbal motor 13, and a microprocessor 14. The motor drive circuit 11, the gimbal motor 13, and the microprocessor 14 are electrically connected to the monitoring circuit 12 respectively. The gimbal motor 13 is connected to the rotor 40 for driving the rotor 40 to rotate.

In some implementations, the body 20 includes a first limiting portion 21, the rotor 40 includes a second limiting portion 41, and the first limiting portion 21 abuts against the second limiting portion 41 when an in-place status of the gimbal motor 13 is in-place. Because a length of a cable inside the PTZ camera 100 is limited, if the rotor 40 continuously rotates relative to the body 20 in a same direction, the cable may be continuously pulled and damaged. Therefore, the first limiting portion 21 and the second limiting portion 41 can limit a rotation stroke of the rotor 40 relative to the body 20, to prevent the cable from being pulled and damaged due to an excessively long rotation stroke.

Specifically, after the model of the gimbal motor 13 is determined, an angle at which the rotor 40 can be driven to rotate each time the gimbal motor 13 rotates at a specific angle can also be determined. In this way, the motor drive circuit 11 can control the rotation angle of the rotor 40 by controlling the rotation angle of the gimbal motor 13, to control a shooting direction of the camera 30. Further, in some implementations, the gimbal motor 13 is a stepper motor, each rotation stepping length of the gimbal motor 13 and a rotation angle of the corresponding rotor 40 are in a determined relationship. The motor drive circuit 11 can control the gimbal motor 13 to rotate by a preset stepping length in a preset direction, to drive, through the gimbal motor 13, the rotor 40 to rotate by an angle corresponding to the preset stepping length, thereby adjusting a shooting angle of the camera 30 arranged on the rotor 40 to a shooting angle required by a user.

In some implementations, in a case that the second limiting portion 41 abuts against one side of the first limiting portion 21, a position of the gimbal motor 13 is used as a rotation start point position of the gimbal motor 13; and in a case that the second limiting portion 41 abuts against an other side of the first limiting portion 21, a position of the gimbal motor 13 is used as a rotation end point position of the gimbal motor 13. A state in which the second limiting portion 41 abuts against the first limiting portion 21 is determined as an "in-place" state of the gimbal motor 13. In this way, the motor drive circuit 11 can determine a position of the gimbal motor 13 relative to a start/end point according to the rotation start point position, the rotation end point position, and the rotation stepping length of the gimbal motor 13, to further determine a rotation position of the rotor 40 according to the correspondence between the gimbal motor 13 and the rotor 40, that is, an orientation of the shooting angle of the camera 30 can be determined.

For example, a rotation stepping length corresponding to the gimbal motor 13 at the rotation start point position is "0 step", and a corresponding rotation stepping length at the rotation end point position is "360 steps". Each time the gimbal motor 13 increases by one rotation step size, the rotor 40 correspondingly rotates clockwise by 1 degree. Each time the gimbal motor 13 decreases by one rotation step size, the rotor 40 correspondingly rotates counterclockwise by 1 degree. In an embodiment, if the motor drive circuit 11 controls the gimbal motor 13 to increase by 60 step sizes from the start point position, a corresponding stepping length is 60 steps when the gimbal motor 13 stops rotating, and the rotor 40 rotates to a position at which an angle between the second limiting portion 41 and the first limiting portion 21 in a clockwise direction is 60 degrees. Then, if the motor drive circuit 11 controls the gimbal motor 13 to decrease by 30 step sizes from a current position, a corresponding stepping length is 30 steps when the gimbal motor 13 stops rotating, and the rotor 40 rotates to a position at which an angle between the second limiting portion 41 and the first limiting portion 21 in a clockwise direction is 30 degrees.

Similarly, the gimbal motor 13 starts from an end point position "360 steps", and then decrease/increase a preset stepping length according to the "360 steps", which can also control the rotor 40 to rotate to a preset position. Details are not described herein.

Therefore, when the stepping length corresponding to the gimbal motor 13 is unknown, the gimbal motor 13 needs to be controlled to rotate to the rotation start point position, and the rotation stepping length corresponding to the gimbal motor 13 at the rotation start point position is set to "0 step". Alternatively, the gimbal motor 13 is controlled to rotate to the rotation end point position, and the rotation stepping length corresponding to the gimbal motor 13 at the rotation end point position is set to "360 steps". In this way, the current position of the gimbal motor 13 can be determined according to a change of a stepping length corresponding to the current position of the gimbal motor 13 relative to the stepping length corresponding to the rotation start/end point position, to further determine a current position of the rotor 40 and an orientation of a current shooting angle of the camera 30. Therefore, it is necessary to determine whether the gimbal motor 13 is in place, to determine whether the gimbal motor 13 rotates to the start/end point position.

Moreover, with reference to the foregoing description, the second limiting portion 41 abuts against the first limiting portion 21 in an in-place state of the gimbal motor 13, and the rotor 40 cannot continuously rotate in a current rotation direction. In this case, the gimbal motor 13 needs to be controlled to stop rotating or reversely rotate. Therefore, it is necessary to determine whether the gimbal motor 13 is in place, to control the gimbal motor 13 to stop rotating or reversely rotate in a case that the gimbal motor 13 is in place.

Moreover, a friction force when the second limiting portion 41 abuts against the first limiting portion 21 may affect the rotation of the gimbal motor 13, and consequently, an actual rotation angle of the gimbal motor 13 is less than the rotation angle corresponding to the rotation stepping length of the gimbal motor 13. In some implementations, the gimbal motor 13 is meshed with the rotor 40 through a gear structure, to transfer a driving force of the gimbal motor 13. Because there is a backlash in the gear structure, the gimbal motor 13 may need to rotate by a specific stepping length before being meshed with the gear structure and starting to rotate. Consequently, in a case that the gimbal motor 13 rotates by the same stepping length, an actual angle by which the rotor 40 is driven by the gimbal motor 13 to rotate is less than an angle by which the rotor 40 is driven by the gimbal motor 13 to rotate and that is determined by the motor drive circuit 11. Based on the foregoing situations, as the gimbal motor 13 continuously rotate back and forth between the start point position and the end point position, the deviation between an actual position of the rotor 40 and a position of the rotor 40 determined by the motor drive circuit 11 may gradually increase, which may eventually cause a control instruction issued by the gimbal motor 13 to the motor drive circuit 11 to fail to rotate the gimbal motor 13 to the rotation start/end point position.

Referring to FIG. 1, for example, the motor drive circuit 11 issues a control instruction to control the gimbal motor 13 to increase by 30 step sizes to rotate to the end point position. However, under the impact of the deviation, the second limiting portion 41 cannot abut against the first limiting portion 21 after the gimbal motor 13 increases by 30 step sizes. Because the motor drive circuit 11 considers that the gimbal motor 13 has reached the end point position after increasing by 30 step sizes, instead of issuing an instruction for controlling the gimbal motor 13 to increase the stepping length, the motor drive circuit 11 only issues an instruction for controlling the gimbal motor 13 to decrease the stepping length. As a result, the gimbal motor 13 cannot drive the rotor 40 to rotate to a position at which the second limiting portion 41 abuts against the first limiting portion 21. Therefore, it is necessary to determine whether the gimbal motor 13 is in place, to ensure that the gimbal motor 13 can drive the rotor 40 to rotate to the position at which the second limiting portion 41 abuts against the first limiting portion 21. Further, after the gimbal motor 13 operates for a period of time, the gimbal motor 13 can be further controlled to rotate to the start point position, to reset the stepping length corresponding to the start point of the gimbal motor 13, to eliminate the deviation. For example, after it is determined that the gimbal motor 13 reaches the start point position, the stepping length corresponding to the gimbal motor 13 is reset to "0 step". In addition, the gimbal motor 13 is controlled to rotate to the end point position, to reset the stepping length corresponding to the end point of the gimbal motor 13. For example, after it is determined that the gimbal motor 13 reaches the end point position, the stepping length corresponding to the gimbal motor 13 is reset to "360 steps", to eliminate the deviation.

Referring to FIG. 1 and FIG. 2, the monitoring circuit 12 is configured to acquire a first signal between the motor drive circuit and the gimbal motor 13, and output a second signal to the microprocessor 14 according to the first signal. The microprocessor 14 is configured to obtain an in-place status of the gimbal motor 13 according to the second signal. The motor drive circuit 11 is configured to control an operating state of the gimbal motor 13 according to the in-place status, to control, when the gimbal motor 13 is in-place, the gimbal motor 13 in time to stop rotating or control the gimbal motor 13 to reversely rotate, thereby preventing the gimbal motor 13 from doing work without rotating and from generating heat.

Figure 3:
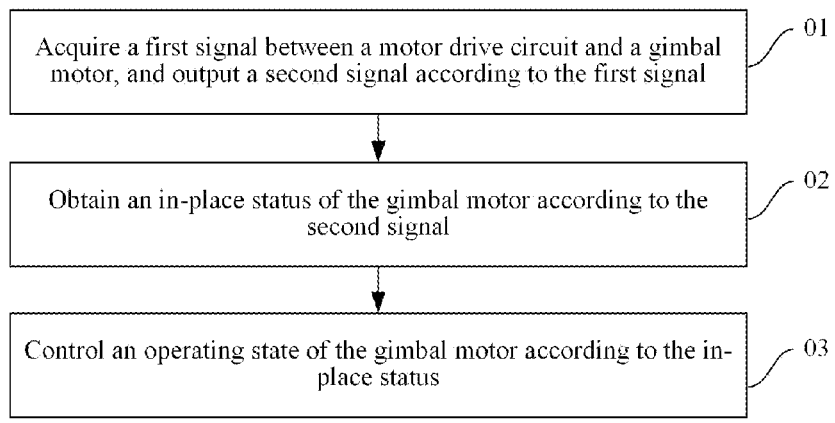
FIG. 3 is a schematic flowchart of a control method according to some implementations of this application.

Referring to FIG. 3, an implementation of this application further provides a control method for a PTZ camera 100, and the control method may be applied to the PTZ camera 100 in the implementation shown in FIG. 1. The control method includes:

01: Acquire a first signal between a motor drive circuit and a gimbal motor 13, and output a second signal according to the first signal.

02: Obtain an in-place status of the gimbal motor 13 according to the second signal.

03: Control an operating state of the gimbal motor 13 according to the in-place status.

Referring to FIG. 1 and FIG. 2, in an embodiment, a working state of the gimbal motor 13 in a case that the first limiting portion 21 does not abut against the second limiting portion 41 is defined as a normal working state. In a case that the first limiting portion 21 abuts against the second limiting portion 41, the gimbal motor 13 is blocked from rotating in a current direction and cannot continuously rotate in the current rotation direction. In this case, the gimbal motor 13 continuously outputs torque and generates heat, and a working state of the gimbal motor 13 in a case the gimbal motor 13 is blocked from rotating is defined as a blocked state. When the gimbal motor 13 is in the blocked state, the gimbal motor 13 may be controlled to stop operating or reversely rotate, to release the blocked state.

The monitoring circuit 12 is arranged between the gimbal motor 13 and the motor drive circuit 11, and is configured to monitor the first signal between the gimbal motor 13 and the motor drive circuit 11. The first signal may be a voltage signal or a current signal. In a case that the gimbal motor 13 is in the normal working state, an amplitude of the first signal may be in a normal range. In a case that the gimbal motor 13 is in the blocked state, that is, the gimbal motor is in an in-place state, the gimbal motor 13 not only outputs torque to do work, but also generates heat. Therefore, power consumption of the gimbal motor 13 in the blocked state is higher than power consumption of the gimbal motor 13 in the normal working state, resulting in an increased value of the first signal. The monitoring circuit 12 correspondingly outputs the second signal to the microprocessor 14 according to the value of the first signal, so that the microprocessor 14 obtains the in-place status of the gimbal motor 13 according to the second signal.

In conclusion, through the control circuit 10 and the control method according to the implementations of this application, a first signal between a gimbal motor 13 and a motor drive circuit 11 can be monitored, to correspondingly generate a second signal according to the first signal, and then obtain an in-place status of the gimbal motor 13 according to the second signal, to control an operating state of the gimbal motor 13 according to the in-place status. In this way, the deviation caused by back-and-forth rotation of the gimbal motor 13 can be eliminated in time, to ensure that the gimbal motor 13 can actually reach an in-place position (for example, a position at which the first limiting portion 41 abuts against the second limiting portion 21) when the motor drive circuit 11 controls the gimbal motor 13 to rotate to the in-place position. Moreover, in a case that the gimbal motor 13 is in place, the operating state of the gimbal motor can be controlled in time, to prevent the gimbal motor 13 from continuously rotating in a blocked direction and continuously generating heat in a case that the gimbal motor 13 is in place.

The following further describes this application with reference to the accompanying drawings.

Figure 4:
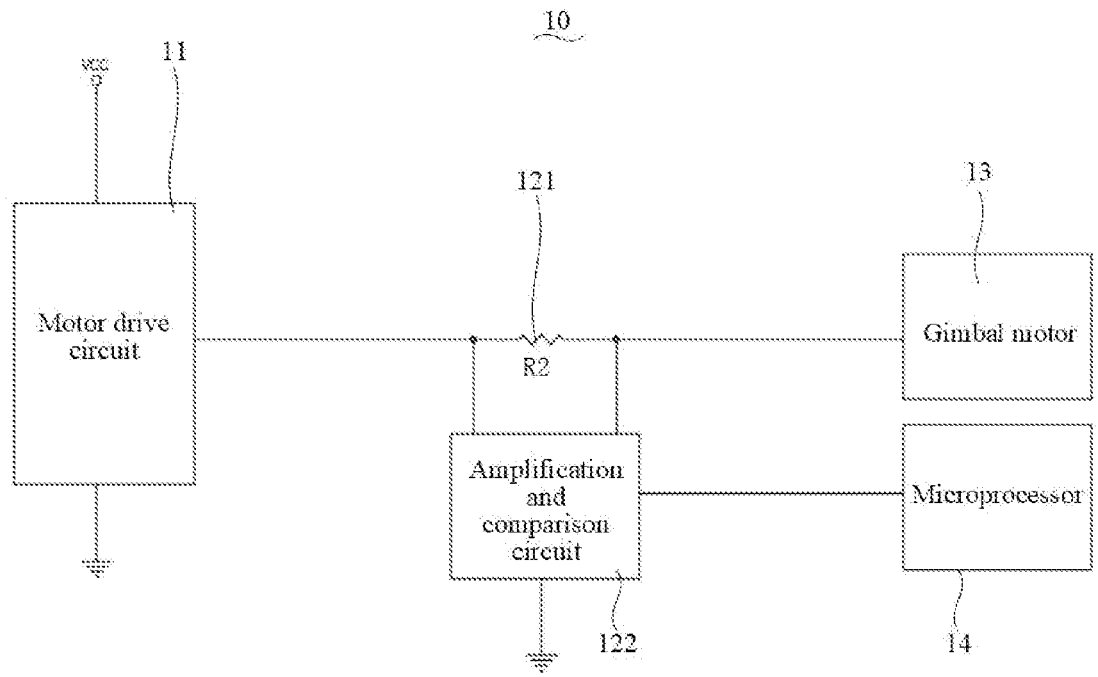
FIG. 4 is a schematic structural diagram of a control circuit of a PTZ camera according to some implementations of this application.

Referring to FIG. 2 and FIG. 4, in some implementations, the first signal includes an operating voltage, and the second signal includes an operating level. The monitoring circuit 12 includes a sampling resistor 121 and an amplification and comparison circuit 122. The sampling resistor 121 is connected in series between the motor drive circuit 11 and the gimbal motor 13. The amplification and comparison circuit 122 and the sampling resistor 121 are connected in parallel to each other and are electrically connected to the microprocessor 14. The amplification and comparison circuit 122 is configured to output the operating level according to the operating voltage and a resistance value of the sampling resistor 121. The microprocessor 14 is configured to obtain the in-place status of the gimbal motor 13 according to the operating level.

Figure 5:
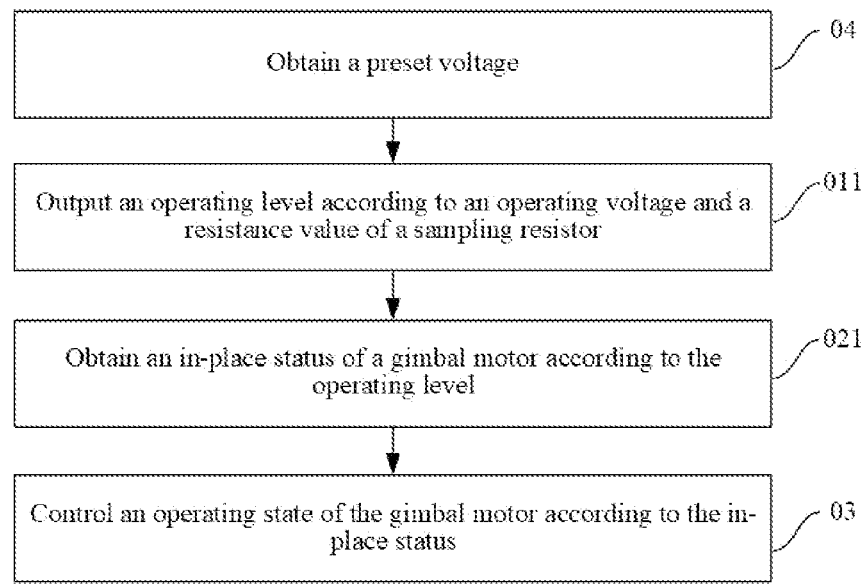
FIG. 5 is a schematic flowchart of a control method according to some implementations of this application.

Referring to FIG. 5, in some implementations, in 01, the outputting a second signal according to the first signal includes:

011: Output an operating level according to the operating voltage and a resistance value of a sampling resistor 121.

In 02, the obtaining an in-place status of the gimbal motor 13 according to the second signal includes:

021: Obtain the in-place status of the gimbal motor 13 according to the operating level.

A range of the resistance value of the sampling resistor 121 is [0.2Ω, 1.0Ω]. For example, the resistance value of the sampling resistor 121 may be 0.2Ω, 0.3Ω, 0.4Ω, 0.5Ω, 0.6Ω, 0.7Ω, 0.8Ω, 0.9Ω, 1Ω, or another resistance value in the range, which is not limited herein.

Specifically, in a case that the first signal is the operating voltage, the second signal is the operating level corresponding to the operating voltage. The amplification and comparison circuit 122 and the sampling resistor 121 are connected in parallel to each other, to acquire an operating voltage of the sampling resistor 121, and output an operating level according to the operating voltage and the resistance value of the sampling resistor 121. The operating level corresponds to the operating state of the gimbal motor 13. In an embodiment, the operating level includes a high level and a low level. In the normal working state of the gimbal motor 13, the amplification and comparison circuit 122 continuously outputs the low level. In the blocked state of the gimbal motor 13, the amplification and comparison circuit 122 continuously outputs the high level. The microprocessor 14 obtains the in-place status of the gimbal motor 13 according to the continuously received operating level.

Figure 6:
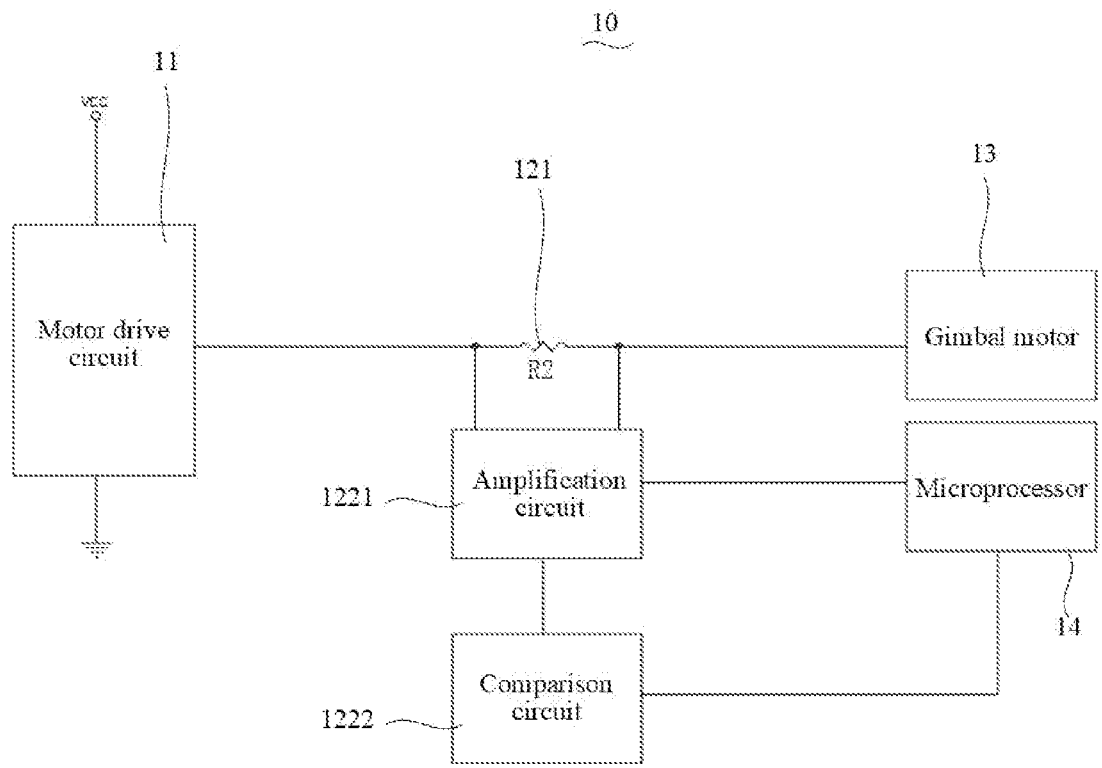
FIG. 6 is a schematic structural diagram of a control circuit of a PTZ camera according to some implementations of this application.

Specifically, referring to FIG. 6, in some implementations, the amplification and comparison circuit 122 includes: an amplification circuit 1221 and a comparison circuit 1222. The amplification circuit 1221 and the sampling resistor 121 are connected in parallel to each other. The amplification circuit 1221 is configured to obtain the operating voltage amplified by a predetermined magnification. The comparison circuit 1222 is configured to output the operating level according to the amplified operating voltage and a preset voltage.

Figure 7:
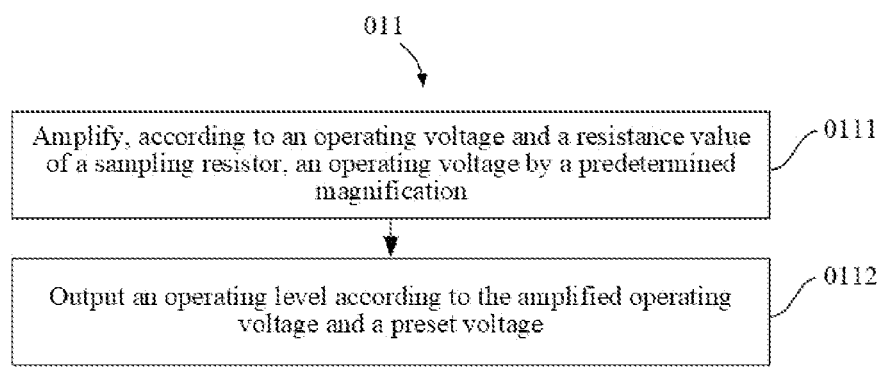
FIG. 7 is a schematic flowchart of a control method according to some implementations of this application.

Referring to FIG. 5 and FIG. 7, in some implementations, the control method further includes: 04: Obtain a preset voltage.

In 011, the outputting an operating level according to the operating voltage and a resistance value of a sampling resistor 121 includes:

0111: Obtain, according to the operating voltage and the resistance value of the sampling resistor 121, the operating voltage amplified by a predetermined magnification.

0112: Output the operating level according to the amplified operating voltage and the preset voltage.

Because the sampling resistor 121 is connected in series between the motor drive circuit 11 and the gimbal motor 13, the voltage of the sampling resistor 121 is the operating voltage of the gimbal motor 13. The amplification circuit 1221 is configured to amplify the operating voltage by the predetermined magnification, to help the comparison circuit 1222 to calculate the operating level, thereby reducing resolution and sensitivity requirements on the comparison circuit 1222.

Figure 8:
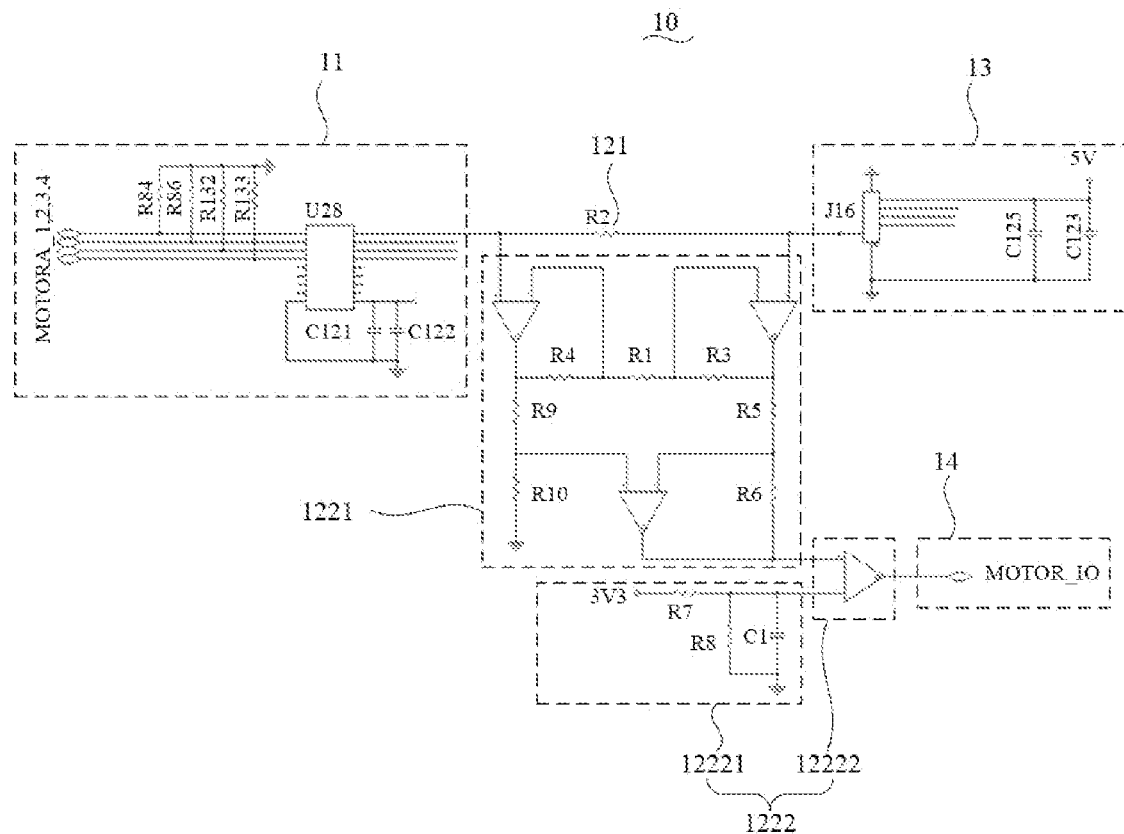
FIG. 8 is a schematic diagram of a control circuit of a PTZ camera according to some implementations of this application.
Figure 9:
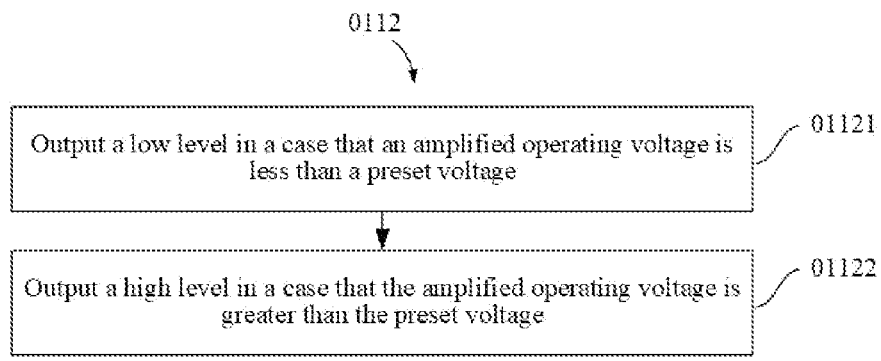
FIG. 9 is a schematic flowchart of a control method according to some implementations of this application.

Referring to FIG. 2, FIG. 6, and FIG. 8, in an embodiment, it is assumed that the sampling resistor 121 is R2, and the amplification circuit 1221 includes resistors R1, R3, R4, R5, R6, R9, and R10, and other electrical elements. The other electrical elements are shown in FIG. 9. R4=R3, R9=R5, R10=R6, and it is assumed that the predetermined magnification is k, where $k=(1+2*R5/R1)*R10/R6=15.3$, that is, the amplification circuit 1221 can amplify the operating voltage by 15.3 times. In other implementations of this application, the predetermined magnification is not limited to 15.3 times, which is not limited herein.

Referring to FIG. 6, in some implementations, the operating level includes a high level and a low level. The comparison circuit 1222 outputs the low level in a case that the amplified operating voltage is less than the preset voltage. The comparison circuit 1222 outputs the high level in a case that the amplified operating voltage is greater than the preset voltage.

Referring to FIG. 9, in some implementations, in 0112, the outputting the operating level according to the amplified operating voltage and the preset voltage includes:

01121: Output the low level in a case that the amplified operating voltage is less than the preset voltage.

01122: Output the high level in a case that the amplified operating voltage is greater than the preset voltage.

Specifically, it is assumed that the operating voltage is V1, the preset voltage is V2, and the predetermined magnification is k. The comparison circuit 1222 outputs the low level in a case that kV1<V2. The comparison circuit 1222 outputs the high level in a case that kV1>V2. In a case that kV1=V2, the comparison circuit 1222 may be configured to output the low level, or the comparison circuit 1222 may be configured to output the high level, which is not limited herein.

Referring to FIG. 8, in some implementations, the comparison circuit 1222 includes a comparator 12222 and a threshold circuit 12221. Two input ends of the comparator 12222 are electrically connected to the amplification circuit 1221 and the threshold circuit 12221 respectively, and an output end of the comparator 12222 is electrically connected to the microprocessor 14. In an embodiment, the threshold circuit 12221 includes a 3.3 V input source, resistors R7 and R8, and other electrical elements. The other electrical elements are shown in FIG. 9. The preset voltage V2=3.3*R8/(R7+R8)=2.37 V. That is, the comparison circuit 1222 outputs the low level in a case that kV1<2.37 V. The comparison circuit 1222 outputs the high level in a case that kV1>2.37 V.

Referring to FIG. 2, FIG. 6, and FIG. 8, in some implementations, the microprocessor 14 determines that the in-place status is in-place in a case that the high level is continuously received.

Figure 10:
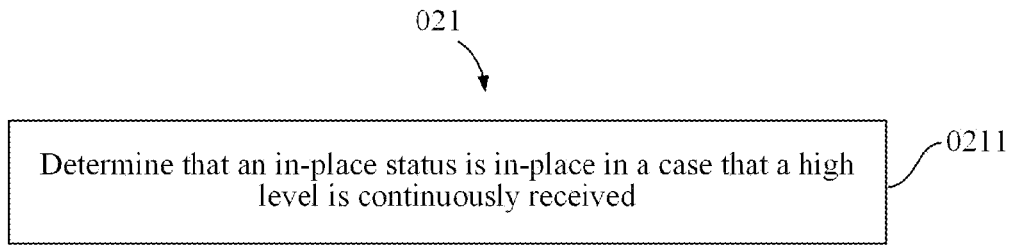
FIG. 10 is a schematic flowchart of a control method according to some implementations of this application.

Referring to FIG. 10, in some implementations, in 021, the obtaining an in-place status of the gimbal motor 13 according to the second signal includes:

0211: Determine that the in-place status is in-place in a case that the high level is continuously received.

The gimbal motor 13 in the blocked state not only outputs torque to do work, but also generates heat. Therefore, power consumption of the gimbal motor 13 in the blocked state is higher than power consumption of the gimbal motor 13 in the normal working state, which is specifically presented as that the amplified operating voltage kV1 is greater than the preset voltage V2. Therefore, in a case that the microprocessor receives the high level, it can be deduced that the gimbal motor 13 is in the blocked state. In some cases, a short-time voltage fluctuation may cause the operating voltage to increase in a short time, resulting in outputting of a high level, which may cause the microprocessor 14 to determine by mistake that the gimbal motor 13 is blocked. Therefore, the microprocessor 14 determines that the in-place status is in-place in a case that the high level is continuously received. Further, the microprocessor 14 determines that the in-place status is in-place in a case that continuously receiving of the low level is changed to continuously receiving of the high level, to ensure that the blocked state of the gimbal motor 13 is correctly determined.

Referring to FIG. 1 and FIG. 2, in some implementations, the first signal includes a current value, the second signal includes an operating current, and the operating current is a current corresponding to the gimbal motor operating in a current working state. The microprocessor 14 pre-stores a preset current. The microprocessor 14 is configured to obtain the in-place status of the gimbal motor 13 according to the operating current and the preset current. The preset current is a current corresponding to the gimbal motor operating in the normal working state.

The monitoring circuit may acquire the current value between the motor drive circuit 11 and the gimbal motor 13, and the current value can reflect the operating current of the gimbal motor 13. In an embodiment, the current value of the first signal that may be acquired by the monitoring circuit may be directly transmitted to the microprocessor 14 as the second signal.

Figure 11:
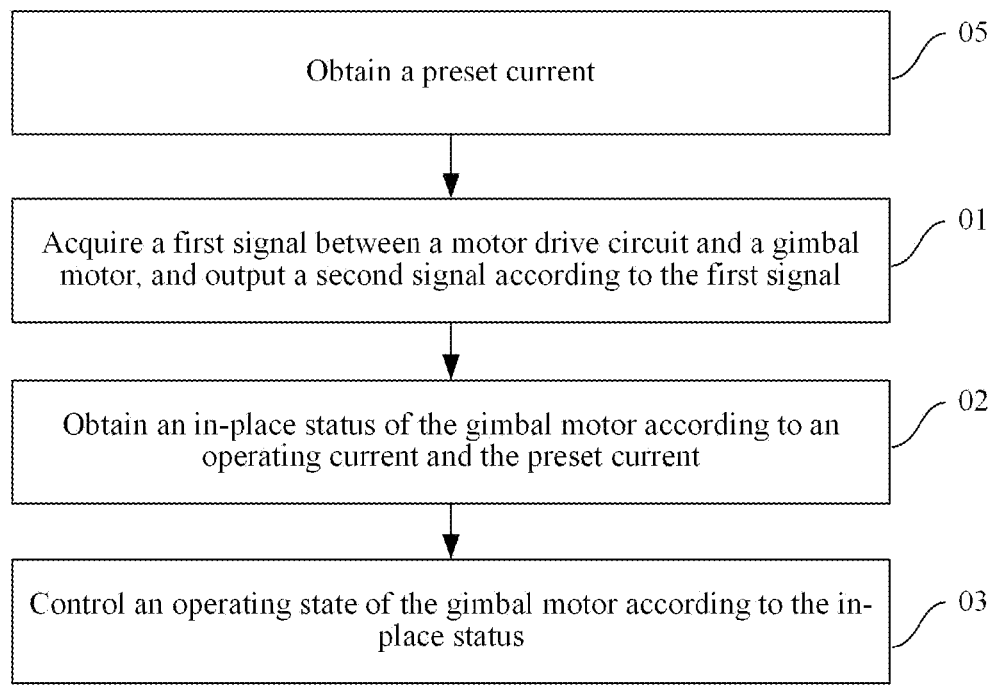
FIG. 11 is a schematic diagram of a circuit of a gimbal motor, a connecting circuit, a comparison circuit, and a circuit of a control device according to some implementations of this application.

Referring to FIG. 11, in some implementations, the control method further includes: 05: Obtain a preset current, the preset current being a current corresponding to the gimbal motor operating in a normal working state.

In 02, the obtaining an in-place status of the gimbal motor 13 according to the second signal includes:

023: Obtain the in-place status of the gimbal motor 13 according to an operating current and the preset current.

With reference to the foregoing description, the gimbal motor 13 in the blocked state not only outputs torque to do work, but also generates heat. Therefore, power consumption of the gimbal motor 13 in the blocked state is higher than power consumption of the gimbal motor 13 in the normal working state, which not only is presented as that the operating voltage is greater than a normal value, but also can be presented as that the operating current is greater than a normal value.

It is assumed that the preset current is A1, and the operating current is A2. Because the preset current A1 is a current corresponding to the gimbal motor 13 operating in the normal working state, when a value of the operating current A2 is relatively close to that of the preset current A1, it can be deduced that a working state corresponding to the operating current A2 is the normal working state. When the value of the operating current A2 is greater than that of the preset current A1 to some extent, it can be deduced that the working state corresponding to the operating current A2 is the blocked state.

Specifically, referring to FIG. 1 and FIG. 2, in some implementations, the microprocessor 14 pre-stores a difference threshold, and the microprocessor 14 is configured to: obtain a difference between an operating current and a preset current; determine that the in-place status is not-in-place in a case that the difference is less than or equal to the difference threshold; and determine that the in-place status is in-place in a case that the difference is greater than the difference threshold.

Figure 12:
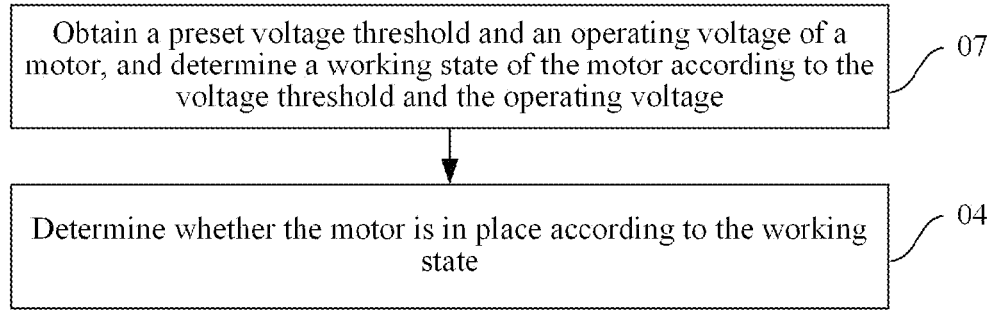
FIG. 12 is a schematic flowchart of a control method according to some implementations of this application.

Referring to FIG. 12, in some implementations, the control method further includes: 06: Obtain a difference threshold.

In 023, the obtaining the in-place status of the gimbal motor 13 according to an operating current and the preset current includes:

0231: Obtain a difference between the operating current and the preset current.

0232: Determine that the in-place status is not-in-place in a case that the difference is less than or equal to the difference threshold.

0233: Determine that the in-place status is in-place in a case that the difference is greater than the difference threshold.

Specifically, the motor drive circuit 11 can obtain a preset difference threshold $\Delta A$, the preset current A1, and the operating current A2. The difference threshold $\Delta A$ is used for determining an extent to which the operating current A2 is greater than the preset current A1. In a case that a difference between the operating current A2 and the preset current A1 is less than the difference threshold $\Delta A$, that is, A2-A1<$\Delta A$, it is considered that the operating current A2 increases not because the gimbal motor 13 is blocked. For example, a normal current fluctuation may cause A2 to increase. In this case, it is still considered that the working state of the gimbal motor 13 is the normal working state, and it is determined that the in-place status is not-in-place. In a case that the difference between the operating current A2 and the preset current A1 is greater than or equal to the difference threshold $\Delta A$, that is, A2-A1$\geq \Delta A$, it is considered that the operating current A2 increases because the gimbal motor 13 is blocked. The working state of the gimbal motor 13 can be determined as the blocked state, and it can be determined that the in-place status is in-place.

Further, in some implementations, in a case that A2-A1≥ΔA, and a time during which A2-A1≥ΔA is maintained exceeds a preset time threshold, it is determined that the in-place status is in-place. In a case that A2-A1≥ΔA, if the time during which the state of A2-A1≥ΔA is maintained does not exceed the preset time threshold, it is still considered that the operating current A2 increases not because the gimbal motor 13 is blocked. It is still considered that the working state of the gimbal motor 13 is the normal working state, and it is determined that the in-place status is not-in-place. In this way, it can be ensured that the determined blocked state is accurate, to avoid the working state of the gimbal motor 13 from being determined by mistake as the blocked state due to environmental factors such as wind resistance and animal interference.

Referring to FIG. 1 and FIG. 2, in some implementations, when the in-place status is in-place, the motor drive circuit 11 controls the gimbal motor 13 to stop rotating or reversely rotate.

Figure 13:
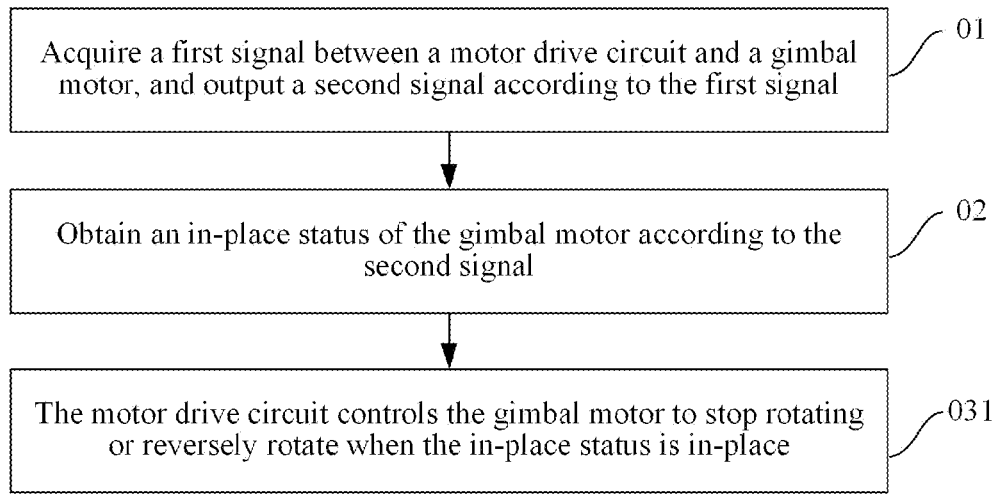
FIG. 13 is a schematic flowchart of a control method according to some implementations of this application.

Referring to FIG. 13, in some implementations, in 03, the controlling an operating state of the gimbal motor 13 according to the in-place status includes:

031: The motor drive circuit 11 controls the gimbal motor 13 to stop rotating or reversely rotate when the in-place status is in-place.

In a case that it is determined that the gimbal motor 13 is in-place, if the gimbal motor 13 continuously rotate in a current direction, the gimbal motor 13 may continuously generate heat. Therefore, the gimbal motor 13 needs to be controlled to stop rotating or reversely rotate to release the blocked state.

Further, the motor drive circuit 11 can reset a stepping length corresponding to a current position of the gimbal motor 13 when determining that the gimbal motor 13 is in place, to determine a change of a stepping length of the gimbal motor 13 relative to a start/end point position according to the reset stepping length when the gimbal motor 13 reversely rotates, to determine the current position of the gimbal motor 13 and a current position of the rotor 40, thereby eliminating the deviation accumulated during the rotation of the gimbal motor 13.

Figure 14:
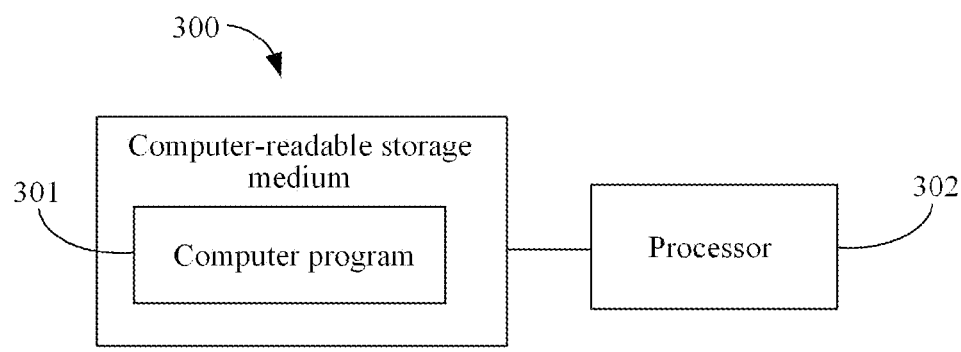
FIG. 14 is a schematic diagram of a computer-readable storage medium and a processor being in a connected state according to some implementations of this application.

Referring to FIG. 14, the implementations of this application further provide a non-transitory computer-readable storage medium 300 including a computer program 301. In some implementations, a ranging system includes a processor 302, and the computer program 301 causes, when executed by one or more processors 302, the one or more processors 302 to perform the control method provided in any one of the foregoing implementations. The non-transitory computer-readable storage medium 300 may be arranged in a PTZ camera 100, a cloud server, or another device. In this case, the PTZ camera 100 can be in communication with the cloud server or another device, to obtain the corresponding computer program 301.

For example, when executed by the one or more processors 302, the computer program 301 causes the one or more processors 302 to perform the method in steps 01, 02, 03, 04, 05, 06, 011, 0111, 0112, 01121, 01122, 021, 023, 0231, 0232, 0233, and 031, for example, perform the following control method:

01: Acquire a first signal between a motor drive circuit and a gimbal motor 13, and output a second signal according to the first signal.

02: Obtain an in-place status of the gimbal motor 13 according to the second signal.

03: Control an operating state of the gimbal motor 13 according to the in-place status.

In another example, when executed by the one or more processors 302, the computer program 301 causes the one or more processors 302 to perform the following control method:

0111: Obtain, according to the operating voltage and the resistance value of the sampling resistor 121, the operating voltage amplified by a predetermined magnification.

01121: Output the low level in a case that the amplified operating voltage is less than the preset voltage.

01122: Output a high level in a case that the amplified operating voltage is greater than the preset voltage.

0211: Determine that the in-place status is in-place in a case that the high level is continuously received.

03: Control an operating state of the gimbal motor 13 according to the in-place status.

In the description of this specification, description of reference terms such as "some implementations" or "one example", means including specific features, structures, materials, or features described in the implementation or example in at least one implementation or example of this application. In this specification, schematic descriptions of the foregoing terms are not necessarily with respect to the same implementation or example. In addition, the described specific characteristics, structures, materials, or features may be combined in a proper manner in any one or more implementations or examples. In addition, with no conflict, a person skilled in the art can integrate and combine different embodiments or examples and features of the different embodiments and examples described in this specification.

Any process or method in the flowcharts or described herein in another manner may be understood as indicating a module, a segment, or a part including code of one or more executable instructions for implementing a particular logical function or process step. In addition, the scope of preferred implementations of this application includes other implementations which do not follow the order shown or discussed, including performing, according to involved functions, the functions basically simultaneously or in a reverse order, which should be understood by a person skilled in the art to which the embodiments of this application belong.

Although the implementations of this application are shown and described above, it may be understood that the foregoing implementations are exemplary, and cannot be understood as a limitation to this application. A person of ordinary skill in the art may make changes, modifications, replacements, and variations to the foregoing implementations without departing from the scope of this application.

What is claimed is:

1. A control circuit of a pan-tilt-zoom (PTZ) camera, comprising:
   a motor drive circuit, a monitoring circuit, a gimbal motor, and a microprocessor, the motor drive circuit, the gimbal motor, and the microprocessor being electrically connected to the monitoring circuit respectively, wherein
   the gimbal motor is configured to drive a rotor of the camera to rotate;
   the monitoring circuit is configured to acquire a first signal between the motor drive circuit and the gimbal motor, and output a second signal to the microprocessor according to the first signal;
   the microprocessor is configured to obtain an in-place status of the gimbal motor according to the second signal; and the motor drive circuit is configured to control an operating state of the gimbal motor according to the in-place status, wherein the first signal comprises an operating voltage, the second signal comprises an operating level, the monitoring circuit comprises a sampling resistor and an amplification and comparison circuit, the sampling resistor is connected in series between the motor drive circuit and the gimbal motor, the amplification and comparison circuit and the sampling resistor are connected in parallel to each other and are electrically connected to the microprocessor, the amplification and comparison circuit is configured to output the operating level according to the operating voltage and a resistance value of the sampling resistor, and the microprocessor is configured to obtain the in-place status of the gimbal motor according to the operating level.

2. The control circuit according to claim 1, wherein a range of the resistance value of the sampling resistor is [0.2Ω, 1.0Ω].

3. The control circuit according to claim 1, wherein the amplification and comparison circuit comprises: an amplification circuit and a comparison circuit, the amplification circuit and the sampling resistor are connected in parallel to each other, the amplification circuit is configured to amplify the operating voltage by a predetermined magnification, and the comparison circuit is configured to output the operating level according to the amplified operating voltage and a preset voltage.

4. The control circuit according to claim 3, wherein the operating level comprises a high level and a low level, wherein:

the comparison circuit outputs the low level in a case that the amplified operating voltage is less than the preset voltage; and the comparison circuit outputs the high level in a case that the amplified operating voltage is greater than the preset voltage.

5. The control circuit according to claim 4, wherein the microprocessor determines that the in-place status is in-place in a case that the high level is continuously received.

6. The control circuit according to claim 1, wherein the first signal comprises a current value, the second signal comprises an operating current, the operating current is a current corresponding to the gimbal motor operating in a current working state, the microprocessor pre-stores a preset current, the microprocessor is configured to obtain the in-place status of the gimbal motor according to the operating current and the preset current, and the preset current is a current corresponding to the gimbal motor operating in a normal working state.

7. The control circuit according to claim 6, wherein the microprocessor pre-stores a difference threshold, and the microprocessor is configured to:

obtain a difference between the operating current and the preset current;

determine that the in-place status is not-in-place in a case that the difference is less than or equal to the difference threshold; and determine that the in-place status is in-place in a case that the difference is greater than the difference threshold.

8. The control circuit according to claim 1, wherein the in-place status comprises not-in-place and in-place, and the operating state comprises continuously rotating, stopping rotating, and reversely rotating, wherein when the in-place status is in-place, the motor drive circuit controls the gimbal motor to stop rotating or reversely rotate.

9. A PTZ camera, comprising: a body, a camera, a rotor, and the control circuit according to claim 1, wherein the camera is fixedly connected to the rotor, the control circuit is arranged on the body, and the gimbal motor is connected to the rotor.

10. The PTZ camera according to claim 9, wherein the body comprises a first limiting portion, the rotor comprises a second limiting portion, and the first limiting portion abuts against the second limiting portion in a case that an in-place status of the gimbal motor is in-place.

11. A control method for a pan-tilt-zoom (PTZ) camera, the PTZ camera comprising a motor drive circuit and a gimbal motor, and the control method comprising:

acquiring a first signal between the motor drive circuit and the gimbal motor, and outputting a second signal according to the first signal;

obtaining an in-place status of the gimbal motor according to the second signal; and controlling an operating state of the gimbal motor according to the in-place status, wherein the PTZ camera further comprises a sampling resistor, the sampling resistor is connected in series between the motor drive circuit and the gimbal motor, the first signal comprises an operating voltage, and the second signal comprises an operating level;

the outputting a second signal according to the first signal comprises:

outputting the operating level according to the operating voltage and a resistance value of the sampling resistor; and the obtaining an in-place status of the gimbal motor according to the second signal comprises:

obtaining the in-place status of the gimbal motor according to the operating level.

12. The control method according to claim 11, wherein the control method further comprises:

obtaining a preset voltage; and the outputting the operating level according to the operating voltage and a resistance value of the sampling resistor comprises:

obtaining, according to the operating voltage and the resistance value of the sampling resistor, the operating voltage amplified by a predetermined magnification; and outputting the operating level according to the amplified operating voltage and the preset voltage.

13. The control method according to claim 12, wherein the operating level comprises a high level and a low level, and the outputting the operating level according to the amplified operating voltage and the preset voltage comprises:

outputting the low level in a case that the amplified operating voltage is less than the preset voltage; and outputting the high level in a case that the amplified operating voltage is greater than the preset voltage.

14. The control method according to claim 13, wherein the obtaining an in-place status of the gimbal motor according to the second signal comprises:

determining that the in-place status is in-place in a case that the high level is continuously received.

15. The control method according to claim 11, wherein the first signal comprises a current value, the second signal comprises an operating current, the operating current is a current corresponding to the gimbal motor operating in a current working state, and the control method further comprises: obtaining a preset current, the preset current being a current corresponding to the gimbal motor operating in a normal working state; and the obtaining an in-place status of the gimbal motor according to the second signal comprises:
obtaining the in-place status of the gimbal motor according to the operating current and the preset current.

16. The control method according to claim 15, wherein the control method further comprises: obtaining a difference threshold; and the obtaining the in-place status of the gimbal motor according to the operating current and the preset current comprises:
obtain a difference between the operating current and the preset current;
determine that the in-place status is not-in-place in a case that the difference is less than or equal to the difference threshold; and
determine that the in-place status is in-place in a case that the difference is greater than the difference threshold.

17. The control method according to claim 11, wherein the in-place status comprises not-in-place and in-place, the operating state comprises continuously rotating, stopping rotating, and reversely rotating, and the controlling an operating state of the gimbal motor according to the in-place status comprises:

controlling, by the motor drive circuit, the gimbal motor to stop rotating or reversely rotate when the in-place status is in-place.

18. A non-transitory computer-readable storage medium, comprising a computer program, the computer program, when executed by one or more processors, implementing the control method according to claim 11.

* * * * *